United States Patent
Federici

(10) Patent No.: US 8,778,434 B2
(45) Date of Patent: Jul. 15, 2014

(54) METHOD AND MODULAR SYSTEM FOR PREPARING A GRANULATED CONFECTIONARY PRODUCT FOR MAKING CORES OR PASTILLES

(75) Inventor: Fabio Federici, Arlon (BE)

(73) Assignee: Soremartec S.A., Arlon (BE)

( * ) Notice: Subject to any disclaimer, the term of this patent is extended or adjusted under 35 U.S.C. 154(b) by 0 days.

(21) Appl. No.: 13/638,580

(22) PCT Filed: Mar. 30, 2011

(86) PCT No.: PCT/IB2011/000683
§ 371 (c)(1),
(2), (4) Date: Dec. 4, 2012

(87) PCT Pub. No.: WO2011/121430
PCT Pub. Date: Oct. 6, 2011

(65) Prior Publication Data
US 2013/0196043 A1    Aug. 1, 2013

(30) Foreign Application Priority Data

Mar. 30, 2010 (IT) ............... TO2010A0253

(51) Int. Cl.
*A23G 3/00* (2006.01)
*B02C 13/10* (2006.01)
*B01F 7/04* (2006.01)

(52) U.S. Cl.
USPC ........... 426/518; 426/660; 426/453; 426/455; 426/519; 426/520; 366/291; 366/325.2; 366/325.3; 241/24.26; 241/154; 241/188.2; 241/189.1

(58) Field of Classification Search
CPC . A23G 1/0026; A23G 1/0033; A23G 1/0036; A23G 1/004; A23G 1/10; A23G 1/14; A23G 3/001; A23G 3/0215; A23G 3/0226; B02C 13/02; B02C 13/10; B02C 13/12; B01F 7/02; B01F 7/022; B01F 7/04
USPC ................ 426/660, 518, 519, 520, 453, 455; 366/79–90, 290–291, 325.2, 325.3; 241/24.26, 154, 188.1, 188.2, 189.1, 241/27
See application file for complete search history.

(56) References Cited

U.S. PATENT DOCUMENTS 1,621,409 A * 3/1927 Horn ............................. 241/154
(Continued)

FOREIGN PATENT DOCUMENTS

| EP | 0 542 131 A2 | 5/1993 |
| EP | 0 734 763 A2 | 10/1996 |

*Primary Examiner* — Drew E Becker
(74) *Attorney, Agent, or Firm* — Dickstein Shapiro LLP

(57) ABSTRACT

A method and system for preparing a granulated product, whereby one or more ingredients are first ground in a centrifugal grinding unit, and then granulated in a centrifugal granulating unit before being fed to a centrifugal mixing and flavoring unit; each of the centrifugal units having a tubular outer shell having an axis and defining a processing chamber; and a powered shaft housed in the shell, coaxially with the axis, and fitted with a row of appendixes projecting radially from, and connected integrally and interchangeably to, the shaft.

8 Claims, 2 Drawing Sheets

(56) References Cited

U.S. PATENT DOCUMENTS

| | | | |
|---|---|---|---|
| 2,824,808 A * | 2/1958 | Gillett et al. | 127/30 |
| 2,875,956 A * | 3/1959 | Lykken et al. | 241/55 |
| 3,956,445 A | 5/1976 | Hunt | |
| 4,440,797 A * | 4/1984 | Berkes et al. | 426/613 |
| 5,171,562 A | 12/1992 | Bridges | |
| 5,376,171 A | 12/1994 | Frye | |
| 5,554,409 A * | 9/1996 | Vezzani | 426/631 |
| 5,984,213 A | 11/1999 | Woodall et al. | |
| 6,231,624 B1 | 5/2001 | Vogler et al. | |

* cited by examiner

METHOD AND MODULAR SYSTEM FOR PREPARING A GRANULATED CONFECTIONARY PRODUCT FOR MAKING CORES OR PASTILLES

TECHNICAL FIELD

The present invention relates to a method of preparing a granulated confectionary product.

The present invention may be used to particular advantage for producing pastilles, which may either be marketed as they are or coated with various, normally sugar- or sweetener-based, products.

BACKGROUND ART

Pastilles are currently formed by preparing a granulated product, fed to compacting machines, which divide the product into given amounts, and compact each into a pastille. To be effectively compacted and produce firm, homogeneous pastilles of a given hardness, the granulated product must have a specific grain size, which also depends on the characteristics of the ingredients of the product.

Granulated products are currently produced using various types of mills for grinding the powdery ingredients to a given grain size (normally no higher than 100 microns). This grinding step is followed by a mixing step, in which other ingredients, such as maltodextrine or gum, are added to the ground ingredients, and the resulting mixture is granulated to modify its grain size, make it more compressible, and improve its organoleptic qualities.

At present, the above process is normally carried out using so-called fluid-bed systems, in which the powdery mixture is first moistened, normally by adding water solutions, and is then mixed and dried. Drying is performed by forming a layer of moist mixture, and blowing hot air through it to gradually form particles of normally 0.5 to 1 mm in size.

Alternatively, the moist mixture is dried in microwave driers.

EP0673644 describes a method and system for preparing a granulated product containing one or more active principles for an effervescent solution.

EP039697 B1 describes a method of producing a granulated powder containing potassium salt.

DE3337770 describes a rotary fluid-bed granulator.

Though widely used, known systems, while only providing for adequate output, are extremely bulky and expensive to both produce and maintain.

Moreover, cleaning known systems, when making production changes or switching from one product or recipe to another, is a long, painstaking job.

DISCLOSURE OF INVENTION

It is an object of the present invention to provide a method of preparing a granulated product.

According to the present invention, there is provided a method of preparing a granulated confectionary product using a modular system comprising a centrifugal grinding unit and a centrifugal granulating unit, which are similar to each other and each comprise an elongated cylindrical shell having a horizontal axis; an inlet for products to be processed in said shell; a processed-product outlet; and a powered rotary shaft housed in said shell, coaxially with said axis, and fitted with a succession of radial pegs fixed with respect to said shaft and arranged between said inlet and said outlet; the method comprising the steps of loading said centrifugal grinding unit with at least some of the ingredients of the granulated product; grinding the ingredients by rotating said shaft at a first speed to spin said ingredients onto an inner surface of said shell, and form a tubular layer of material of a first thickness; taking said ingredients out of said centrifugal grinding unit; loading said ingredients into the centrifugal granulating unit; moistening said ingredients by feeding at least a water solution into said centrifugal granulating unit to form a moist mixture; and granulating said moist mixture by heating the shell of said centrifugal granulating unit, rotating the shaft of said centrifugal granulating unit at a second speed, and spinning the moist mixture onto the inner surface of said centrifugal granulating unit to form a tubular layer of granulating material of a second thickness greater than said first thickness.

According to the present invention, there is provided a modular system for preparing a granulated confectionary product using the method described and claimed herein, the system comprising a centrifugal grinding unit and a centrifugal granulating unit, which are similar to each other and each comprise an elongated cylindrical shell having a horizontal axis; an inlet for products to be processed in said shell; a processed-product outlet; a powered rotary shaft housed in said shell, coaxially with said axis, and fitted with a succession of identical radial appendixes or pegs fixed angularly with respect to said shaft and arranged between said inlet and said outlet; and heating means for heating said shell; said granulating unit also comprising spraying means for spraying a granulating liquid into the respective said shell; and the distance between the free ends of the pegs and the inner surface of said shell of said centrifugal granulating unit being greater than the distance between the free ends of the pegs and the inner surface of said shell of said centrifugal grinding machine.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
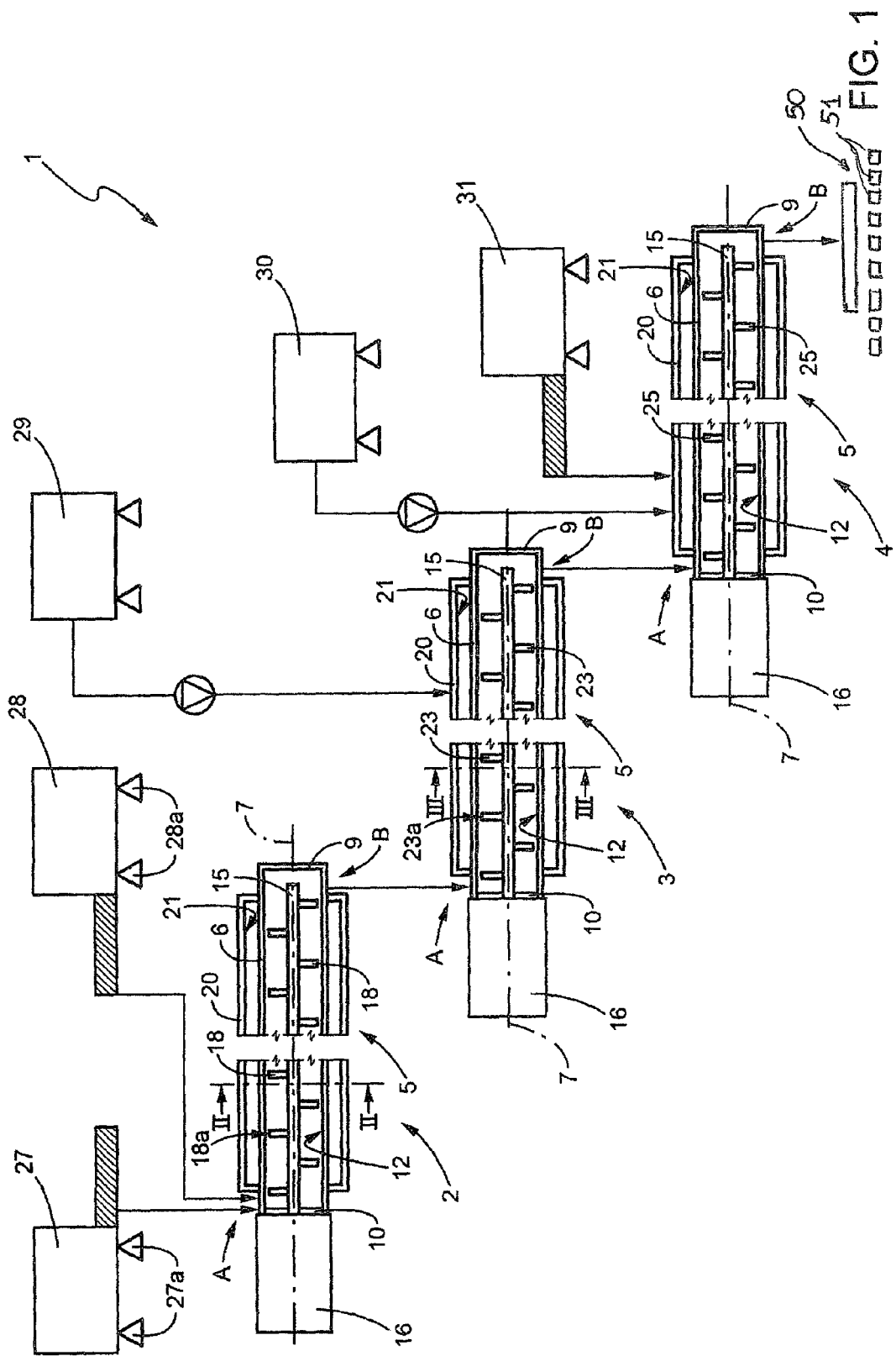
FIG. 1 shows a schematic, substantially block diagram of a preferred embodiment of a modular system for preparing a granulated confectionary product in accordance with the teachings of the present invention.

Number 1 in FIG. 1 indicates as a whole a modular system for producing firm cores or pastilles, and in particular for preparing a granulated confectionary product, such as a mixture for making pastilles such as TIC TAC® manufactured by the Applicant, to which the following description refers, both in terms of ingredients and production conditions, purely by way of example.

System 1 comprises a first, second and third centrifugal unit 2, 3, 4 cascaded or arranged in series to continuously supply a granulated confectionary product of a given grain size—in this case, 200-800 microns—and which can be compacted into a firm, homogeneous body.

Unit 2 comprises a substantially horizontal outer casing 5, in turn comprising a tubular, preferably cylindrical, shell 6 extending coaxially with a respective axis 7 and closed at opposite ends by two end walls 9, 10. Tubular shell 6 and end walls 9, 10 together define a processing chamber 12, which communicates with the outside through an in inlet A for loading the ingredients to be processed, and an outlet B for unloading the processed ingredients.

Figure 2:
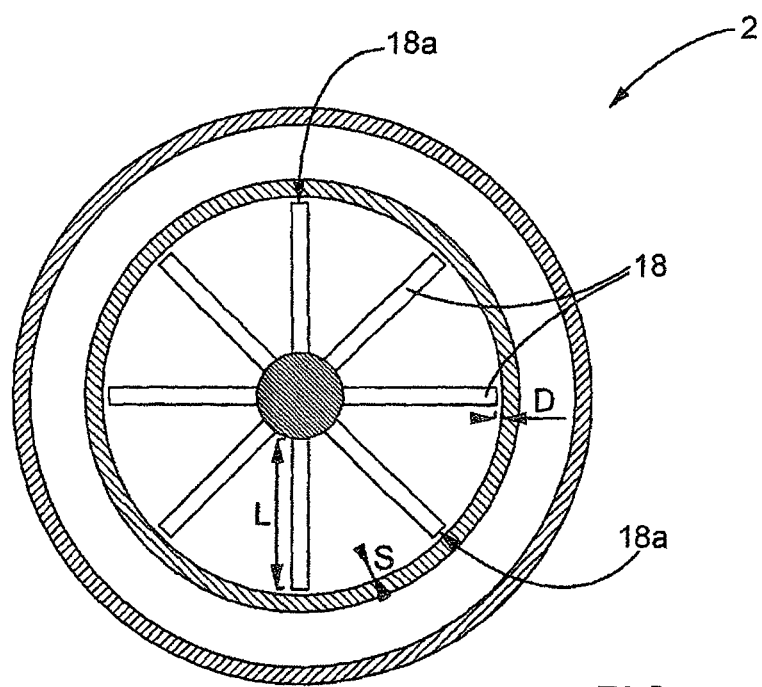
FIG. 2 shows a larger-scale section along line II-II in FIG. 1.

A shaft 15, rotated by a motor reducer 16, extends, coaxially with axis 7, through end wall 10, and is fitted integrally with one or more coiled rows of radial pegs or appendixes 18, each of which, in the example described, has a constant cross section along its whole length, and a straight generatrix. Each radial appendix 18 has a stem connected releasably to shaft 15, and is of such a length L (FIG. 2) that its free-end surface 18a is separated by a distance D of 0.2 to 4 millimeters, and conveniently of 2 millimeters, from the inner surface 6a of shell 6 (FIG. 2). Appendixes 18 are interchangeable, and selectable from a number of appendixes of different lengths L, to adjust distance D.

Casing 5 also comprises an annular portion 20, which encloses shell 6 and defines with it an annular chamber 21 communicating externally through an inlet and outlet for temperature-controlled fluid for conditioning shell 6.

Figure 3:
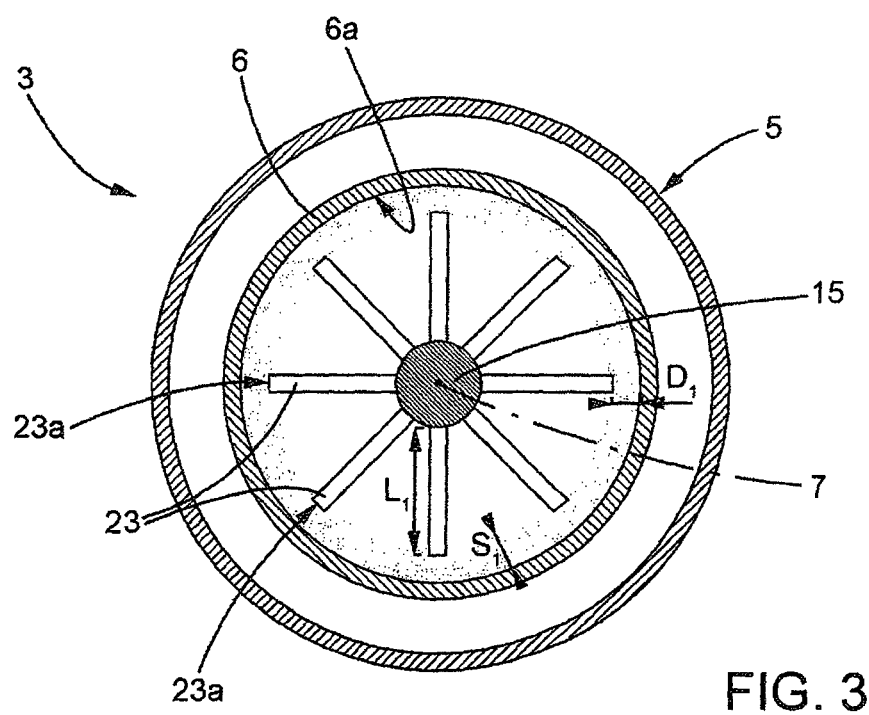
FIG. 3 shows a larger-scale section along line in FIG. 1.

Unit 3 is similar to unit 2, and its component parts are indicated using the same reference numbers as for the corresponding parts of unit 2. The only difference between units 2 and 3 lies in the pegs or appendixes 23 of unit 3 all being shorter than appendixes 18 of unit 2. More specifically, each appendix 23 is of a length L1 shorter than length L, so that its free-end surface 23a is separated by a distance D1 of 2 to millimeters, and conveniently of 5 millimeters, from relative inner surface 6a (FIG. 3).

Unit 4 is similar to unit 3, and differs from units 2 and 3 solely by having appendixes 25 of such a length that the free-end surface of each is separated by a distance of 5 to 10 millimeters, and conveniently of 5 millimeters, from relative inner surface 6a. The specific distances indicated provide for obtaining ingredients with such a grain size as to mix thoroughly with the water solution and form a perfectly homogeneous starting mixture; for obtaining continuous, gradual granulation, by virtue of the thicker layer of material being worked in the granulating unit; and for maintaining a practically constant grain size of the product from the granulating unit throughout the flavouring stage.

As shown in FIG. 1, system 1 also comprises two known metering devices 27, 28 mounted on load cells 27a, 28a and designed to feed unit 2, respectively, with precise measures or a continuous supply of granulated sugar of conveniently 2000-3000 micron grain size, and maltodextrine of roughly 200 micron grain size.

As shown in FIG. 1, system 1 also comprises a water solution or plain water dispenser 29 with one or more nozzles inside shell 6 of unit 3; and two dispensers 30 and 31 for respectively feeding chamber 12 of unit 4 with liquid or powdered natural flavourings, and a powdered lubricant, such as magnesium stearate.

The granulated confectionary product is produced as follows. First of all, the sugar and maltodextrine are fed through inlet A into chamber 12 of unit 2, and shaft 15 is then rotated at a speed of 3000-10,000 rpm for a time ranging between 0.5 and 5 minutes, and conveniently for 4 minutes. As the shaft rotates, the centrifugal force produced by appendixes 18, and the small distance D between the ends of appendixes 18 and the inner surface 6a of shell 6, not only mix but also grind the sugar and maltodextrine to a 100-200 micron grain size. As the sugar and maltodextrine are ground, the centrifugal force also spins them onto inner surface 6a of shell 6, where they form a layer of refined mixture of a thickness S (FIG. 2) ranging between 0.2 and 4 millimeters. During the grinding process, shell 6 is maintained at a temperature of 15 to 30° C. by feeding coolant through respective chamber 21.

Once ground, the refined mixture is fed to unit 3, its shaft 15 is rotated at a speed of 200-2000 rpm, and, at the same time, water or water solution is sprayed in by dispenser 29 and the nozzle/s inside shell 6. At this stage, the shell of unit 3 is maintained at a temperature of 25 to 70° C., and conveniently about 50° C., by feeding conditioning fluid through relative chamber 21. Given the greater distance between the ends of the appendixes and the shell 6, the centrifugal force produced by rotation of shaft 15 produces inside unit 3 a layer of material of 2-8 mm thickness S1, which swirls to initiate and sustain a granulation process on the inner surface of the shell which, being heated, transmits thermal energy to the product. Granulation is thus completed in 2 to 7, and normally 5, minutes, by which time the grain size of the product in the chamber of unit 3 ranges between 200 and 800 microns.

At this point, the granulated product is taken out of unit 3 and fed into unit 4. Together with the granulated product, the natural flavourings and magnesium stearate are fed into unit 4 by dispensers 30 and 31. Shaft 15 is rotated at a speed of 200-2000 rpm; the product is kept inside unit 4 for 2-7, and preferably 5, minutes; and the shell is conveniently maintained at 20° C. or ambient temperature. As it is mixed, the mixture is thus spun onto the inner surface of the shell of the mixing and homogenizing centrifugal unit 4 to form a layer of mixing material of a different thickness from that of the mixture at the granulating stage, and from that of the ingredients at the grinding stage, but such as not to substantially alter the grain size of the granulated product.

From the outlet of unit 4, the processed granulated product, possibly after being dried, is either transferred to the storage facility (not shown) of known compacting machines (not shown), or is compacted straightaway. To do this, system 1 comprises a metering device 50, which divides the granulated product into given amounts 51, each of which is then compressed into a firm core or pastille, which may be marketed either as it is or coated.

The granulated product is thus prepared and formed into cores continuously and extremely quickly from ingredients of any grain size, and in particular using a compact modular system that is extremely easy to run and control.

This is mainly due to the various operations, in particular, grinding, granulating and mixing/flavouring, being performed using centrifugal machines of the same class. Units 2, 3, 4, in fact, differ solely in the length of appendix or pegs, i.e. the size of the radial gap between the relative shell and the ends of the relative appendixes.

Being connected releasably to relative shafts 15, and not having to be positioned angularly with respect to the shafts about the relative longitudinal axes, appendixes 18, 23, 25 can be changed quickly and easily, thus enabling units 2, 3, 4 to be configured or converted quickly to different uses or products. Units 2, 3, 4 described, in fact, may obviously be used for confectionary products other than the one described by way of example, and, in particular, as part of the production process for manufacturing pastilles or chewing gum marketed either as they are or coated with various substances.

In addition, units 2, 3, 4 are compact, in this case ranging from 150 to 500 mm in diameter and 200 to 2000 mm in length, while still providing for high output levels comparable with those of bulkier, more complicated currently used machines.

This is mainly due to the formation, inside each unit 2, 3, 4, and particularly inside unit 3, of a very thin tubular layer of product, so that heat is transferred by relative shell 6 substantially by conduction from the material which therefore dries and granulates rapidly. The formation of thin layers of product also speeds up grinding of the ingredients to the desired grain size.

Units 2, 3, 4 also allow liquid flavourings to be fed directly into the process, thus reducing the risk of the flavourings degrading.

The significant reduction, as compared with conventional methods, of the number of parts coming into contact with the product drastically reduces and simplifies washing between batches and when switching from one flavour to another. Thanks to this feature, the same system, as opposed to dedicated lines, can be used for producing different flavours.

Clearly, changes may be made to system 1 and the method described without, however, departing from the protective scope as defined in the accompanying Claims. In particular, a different grinding unit, even remote from unit 3, may be substituted for unit 2; and, as regards the method, the fed confectionery products may obviously differ from those referred to by way of example.

The invention claimed is:

1. A method of preparing a granulated confectionary product, for making firm cores or pastilles, comprising a centrifugal grinding unit and a centrifugal granulating unit, grinding and granulating units being distinct and independent units arranged in cascade formation, which are similar to each other and each comprise an elongated cylindrical shell having a horizontal axis; an inlet for products to be processed in said shell; a processed-product outlet; and a powered rotary shaft housed in said shell, coaxially with said axis, and fitted with a coiled row of identical radial pegs each of which has a constant cross section along its whole length and a straight generatrix connected releasably with respect to said shaft and arranged between said inlet and said outlet; a distance of the free ends of the pegs of the granulating unit from the respective shell being greater then a distance of the free ends of the pegs of the grinding unit from the respective shell; the method comprising the steps of loading said centrifugal grinding unit with at least some of the ingredients of the granulated product; grinding the ingredients by rotating said shaft at a first speed to spin said ingredients onto an inner surface of said shell, and form a tubular layer of material of a first thickness; taking said ingredients out of said centrifugal grinding unit; feeding said ingredients into the centrifugal granulating unit; moistening said ingredients by feeding at least a water solution into said centrifugal granulating unit to form a moist mixture; and granulating said moist mixture by heating the shell of said centrifugal granulating unit, rotating the shaft of said centrifugal granulating unit at a second speed, and spinning the moist mixture onto the inner surface of said centrifugal granulating unit to form a tubular layer of granulating material of a second thickness greater than said first thickness.

2. A method as claimed in claim 1, characterized in that, at said granulating step, the shaft of said centrifugal granulating unit is rotated at a speed of 200-2000 rpm for 2-7 minutes.

3. A method as claimed in claim 1, characterized in that, at said granulating step, the shell of said centrifugal granulating unit is heated to a temperature of 25-70° C.

4. A method as claimed in claim 1, characterized in that, at said grinding step, the shaft of said grinding unit is rotated faster than the shaft of said centrifugal granulating unit at said granulating step.

5. A method as claimed in claim 4, characterized in that, at said grinding step, the shaft of said centrifugal grinding unit is rotated at a speed of 3000-10,000 rpm for 0.5-5 minutes.

6. A method as claimed in claim 1, characterized in that, at said grinding step, the shell of said centrifugal grinding unit is maintained at a temperature of 15-30° C.

7. A method as claimed in claim 1, characterized by taking the granulated product out of said granulating unit; feeding the granulated product into a centrifugal mixing and flavouring unit similar to said granulating unit; feeding a liquid or powdered flavouring substance into said centrifugal mixing unit; and rotating the shaft of said centrifugal mixing unit at a different speed from the shaft of said granulating unit.

8. A method as claimed in claim 7, characterized in that the mixing operation is performed by spinning the mixture onto the inner surface of the shell of said centrifugal mixing and flavouring unit to form a tubular layer of granulated material of a different thickness from that of the granulating mixture.

\* \* \* \* \*